Aug. 28, 1945.  M. A. BENTON  2,383,761
RECEPTACLE FILLING APPARATUS
Filed Feb. 9, 1944  3 Sheets-Sheet 3
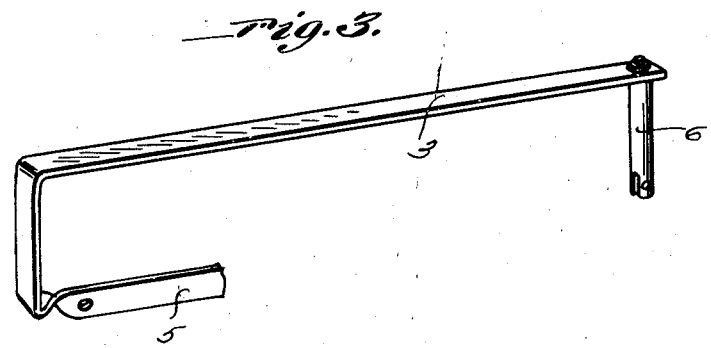
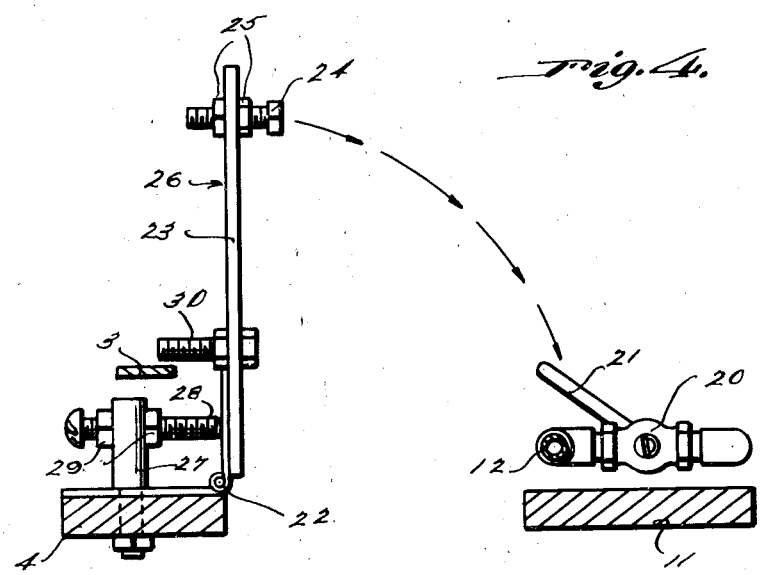
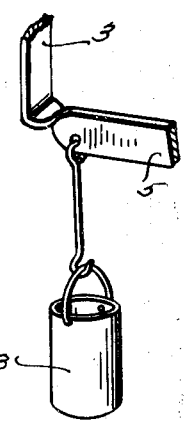
Inventor
Medwin A. Benton
By Clarence A. O'Brien
and Harvey B. Jacobson
Attorneys Patented Aug. 28, 1945

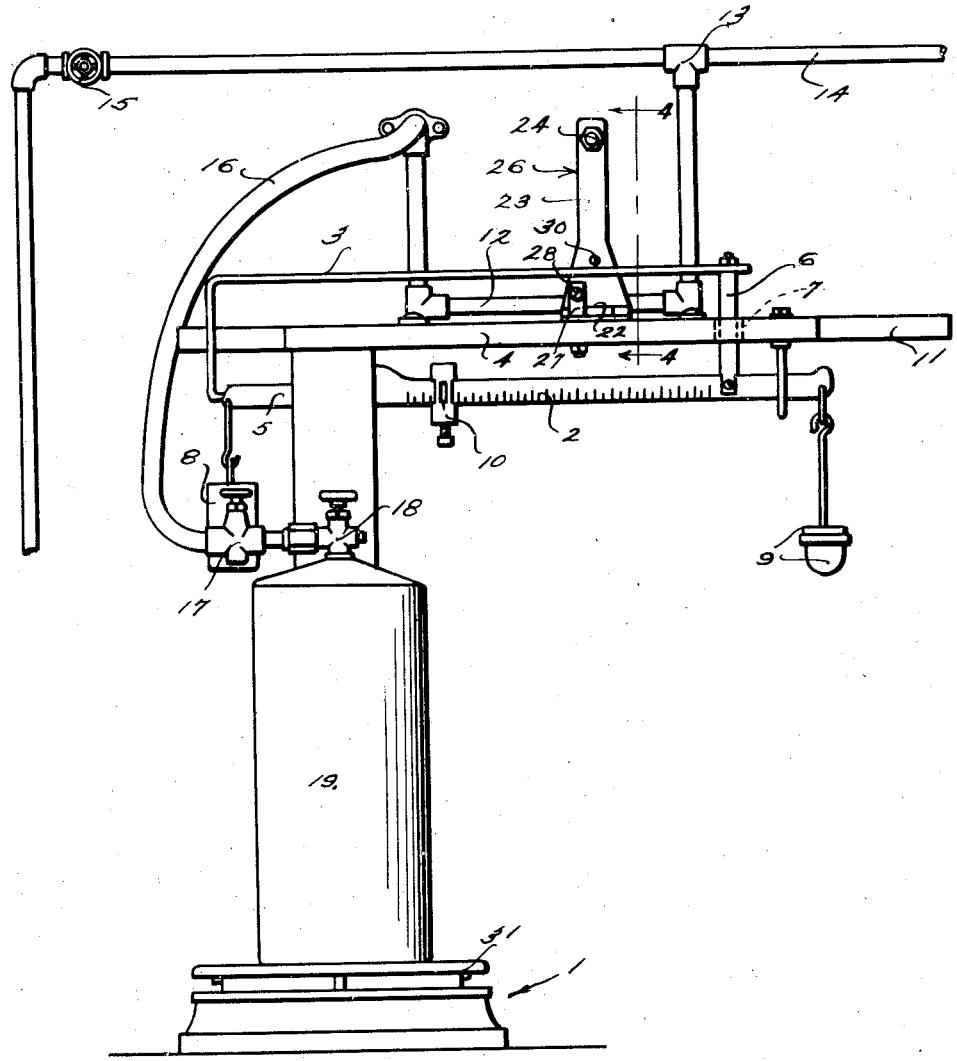

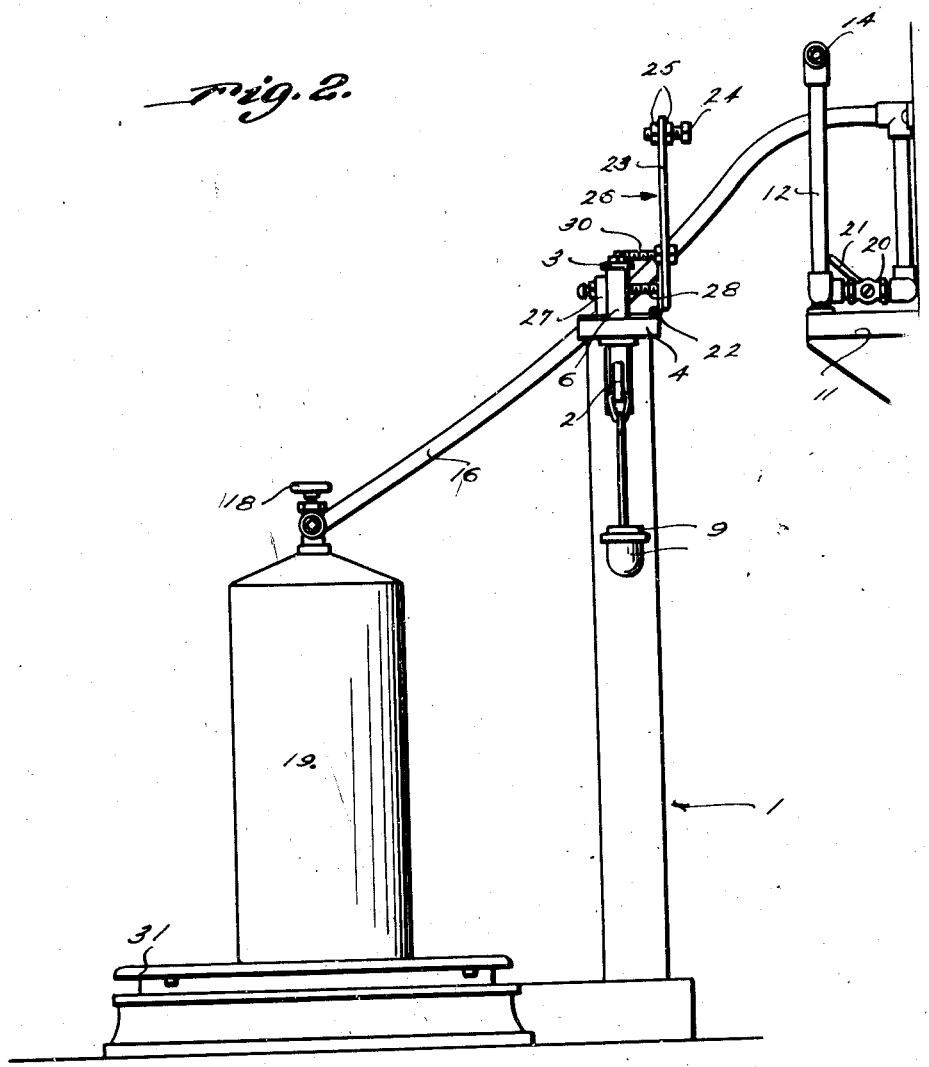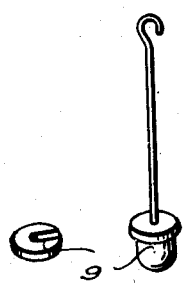

2,383,761

UNITED STATES PATENT OFFICE 2,383,761

RECEPTACLE FILLING APPARATUS

Medwin A. Benton, Liberty, N. Y.

Application February 9, 1944, Serial No. 521,676

2 Claims. (Cl. 249—58)

The present invention relates to new and useful improvements in means for filling portable receptacles, particularly propane or bottled gas cylinders, and has for its primary object to provide, in a manner as hereinafter set forth, an apparatus comprising a novel construction and arrangement for automatically shutting off the flow of gas when a predetermined weight is reached.

Other objects of the invention are to provide an apparatus of the aforementioned character which will be comparatively simple in construction, durable, highly efficient and reliable in operation, compact and which may be manufactured at low cost.

All of the foregoing, and still further objects and advantages of the invention, will become apparent from a study of the following specification, taken in connection with the accompanying drawings wherein like characters of reference designate corresponding parts throughout the several views, and wherein:

Figure 1 is a view in front elevation of an apparatus constructed in accordance with the present invention.

Figure 2 is a side elevational view thereof.

Figure 3 is a perspective view of the scale beam attachment.

Figure 4 is a cross sectional view, taken substantially on the line 4—4 of Figure 1.

Figure 5 is a fragmentary view in perspective of one end portion of the scale beam attachment, showing the counterweight suspended therefrom.

Figure 6 is a perspective view of the pendant weights of the scale.

Referring now to the drawings in detail, it will be seen that reference character 1 designates generally a scale of the platform and beam type. Mounted on the beam 2 of the scale 1 in parallelism therewith is a metallic bar 3 which extends above the supporting arm 4 carried by the post of said scale. The bar 3 includes an angular end portion 5 which is fixed in any suitable manner to the inner end portion of the beam 2. A post 6 supports the other end of the bar 3 on the outer end portion of the beam 2. An opening 7 in the supporting arm 4 accommodates the post 6. A counterweight 8 in the form of a bucket for the reception of shot is suspended from the end portion 5 of the bar 3. Pendant weights 9 are suspended from the outer end of the beam 2. A conventional slidable weight 10 is operable on the beam 2.

Mounted on a shelf, platform or other suitable support 11 adjacent the arm 4 of the scale 1 is a gas line 12. The line 12 is connected at one end, as at 13, to a main line 14 having interposed therein a control valve 15. Connected to the other end of the line 12 is a hose 16. On one end of the hose 16 is a valve 17 for connection to the usual valve 18 of the cylinder or bottle 19 to be filled. Interposed in the line 12 is a shutoff valve 20 comprising an operating handle 21.

A hinge 22 (see Fig. 4) is secured on the supporting arm 4 adjacent the valve 20. Mounted on the hinge 22 is a vertically swinging arm 23. Mounted on the free end portion of the arm 23 is a bolt 24 for engagement with the valve handle 21. Nuts 25 secure the bolt 24 in position on the arm 23. The members 23, 24 and 25 constitute what may be considered a hammer 26 for closing the valve 20.

Rising from the stationary leaf of the hinge 22 on the arm 4 is a post 27. Mounted transversely in the post 27 is a screw 28 which is engageable with the swinging leaf of the hinge 22 to function as a stop for the hammer 26. Nuts 29 secure the stop screw 28 in position in the post 27. Mounted in the lower portion of the arm 26 is a pin 30 in the form of a bolt which projects over the bar 3 for engagement thereby.

It is thought that the operation of the invention will be readily apparent from a consideration of the foregoing. Briefly, the cylinder 19 to be filled is mounted on the platform 31 of the scale 1 and said scale is adjusted to compensate for the tare or weight of said cylinder, the valve 17, et cetera. The hammer 26 is swung upwardly to a substantially vertical position into engagement with the stop 28 with the pin 30 projecting over the bar 3. The valve 20 is opened through the medium of the handle 21, which is now in the path of the hammer 26, and gas flows from the main line 14 through the line 12, the hose 16, and the valves 17 and 18 into the cylinder or bottle 19 on the platform 31 of the scale 1. When the cylinder 19 has been filled to the desired weight, the platform 31 is depressed and the beam 2 is swung upwardly in the usual manner. When this occurs, the bar 3 strikes the pin 30 and starts the hammer 26 which swings downwardly by gravity and strikes the handle 21 of the valve 20. Thus, the handle 21 is actuated in a direction to close the valve 20, thereby automatically shutting off the flow of gas to the cylinder 19.

It is believed that the many advantages of a receptacle filling apparatus constructed in accordance with the present invention will be readily understood, and although a preferred embodiment of said apparatus is as illustrated and described, it is to be understood that changes in the details of construction and in the combination and arrangement of parts may be resorted to which will fall within the scope of the invention as claimed.

What is claimed is:

1. A receptacle filling apparatus of the character described comprising a scale including a frame, a depressible platform operable by a receptacle placed thereon and a beam supported by said frame operable by said platform, a supply line for connection to the receptacle, a shut-off valve in said supply line, a gravity-actuated hammer hingedly mounted for vertical swinging movement on the frame and engageable with the valve for closing same, a stop on the frame for supporting the hammer in raised position, a pin on the hammer, and a bar mounted on the beam and engageable with the pin for initially starting the hammer toward the valve.

2. A receptacle filling apparatus of the character described comprising a scale including a depressible platform operable by a receptacle placed thereon and further including a beam operable by the platform, a supporting structure for said scale including a post and a horizontal arm on said post, a supply line for connection with the receptacle, a shut-off valve, including an operating handle interposed in said supply line, a bar above the arm having one end secured to one end of the beam, a post supporting the other end of the bar on the other end portion of the beam, the second-named post extending slidably through the arm, a hammer mounted for vertical swinging movement on the arm and engageable by gravity with the operating handle of the valve for closing said valve, means on the arm for supporting the hammer in raised position, and a pin on the hammer engageable by the bar upon upward swinging movement thereof with the beam for initially starting the hammer downwardly into engagement with the valve handle.

MEDWIN A. BENTON.